US007900713B2

(12) United States Patent
Chen

(10) Patent No.: US 7,900,713 B2
(45) Date of Patent: Mar. 8, 2011

(54) MAIN SHAFT LOCKING MECHANISM

(75) Inventor: Ting-Kuang Chen, Keelung (TW)

(73) Assignee: Top Gearbox Industry Co., Ltd., Jhongli (TW)

( * ) Notice: Subject to any disclaimer, the term of this patent is extended or adjusted under 35 U.S.C. 154(b) by 77 days.

(21) Appl. No.: 12/537,404

(22) Filed: Aug. 7, 2009

(65) Prior Publication Data

US 2011/0030984 A1 Feb. 10, 2011

(51) Int. Cl.
*B25B 21/00* (2006.01)
*B25F 5/00* (2006.01)

(52) U.S. Cl. ........... 173/29; 173/178; 173/216; 173/217; 192/223.1

(58) Field of Classification Search .................... 173/29, 173/47, 178, 217, 216, 132, 171, 213, 93.5; 192/223.1, 38, 54.4, 223, 223.2
See application file for complete search history.

(56) References Cited

U.S. PATENT DOCUMENTS 5,984,022 A * 11/1999 Harman et al. ............... 173/176
6,035,947 A * 3/2000 Chung ......................... 173/93.5
6,305,481 B1 * 10/2001 Yamazaki et al. ............ 173/178
6,338,404 B1 * 1/2002 Chen ............................ 192/223
6,702,090 B2 * 3/2004 Nakamura et al. ......... 192/223.2
6,715,562 B1 * 4/2004 Chen ............................ 173/93.5
6,805,206 B2 * 10/2004 Hanke ............................ 173/48
7,063,201 B2 * 6/2006 Nakamura et al. ......... 192/223.1
7,118,507 B2 * 10/2006 Tomita et al. ................. 475/263
7,287,602 B2 * 10/2007 Zeiter et al. ................... 173/213
7,395,874 B2 * 7/2008 Zeiter ........................... 173/179

FOREIGN PATENT DOCUMENTS

TW 334869 6/1998
TW 410714 11/2000

* cited by examiner

*Primary Examiner* — Scott A. Smith
(74) *Attorney, Agent, or Firm* — Rabin & Berdo, P.C.

(57) ABSTRACT

A main shaft locking mechanism includes a fixing ring, a main shaft and detents. The main shaft includes an equilateral portion that has an equilateral cross section. A number of the corners of the equilateral portion is equal to that of the detents. The detent has an exterior side and an interior side opposite to the exterior side. The interior side includes two corner protrusions protruded out from two ends thereof and a concave portion defined between the two corner protrusions. The corners of the main shaft are received in the concave portions of the detents. When the main shaft is manually driven to rotate, the corners of the main shaft drive the detents to deviate. Therefore, the exterior sides of the detents interfere against the fixing ring. Then the detents prevent the main shaft from further rotating, thus locking up the main shaft.

4 Claims, 4 Drawing Sheets

MAIN SHAFT LOCKING MECHANISM

BACKGROUND OF THE INVENTION

1. Field of the Invention

The present invention relates generally to a main shaft locking mechanism applicable for a power tool, according to which when the power tool is not provided with power supply, the main shaft of the power tool is prevented from being rotated by any external force.

2. The Prior Arts

A conventional power tools, e.g., a power drill, is typically driven by electric power, and can be classified into corded, cordless (chargeable) or both. Generally, the power tool not only can hold a drilling bit for forming a hole, but also can hold a screwdriver bit to screw or unscrew a screw. Usually, the corded power tool is more powerful than the cordless power tool and is more suitable for heavy duty. However, when the power tool is used in places without any socket, the cordless power tool driven by a chargeable battery is the only option. Unfortunately, when the battery is running low and is unable to recharge, the cordless power tool is unable to operate. Similarly, a sudden power failure may instantly disable the corded power tool. When the power is not supplied normally, the power tool can be temporarily operated as a manual tool. For example, the power tool is used as a regular manual screwdriver.

A conventional power tool usually includes a motor having a driving shaft, a driving gear coupled with the driving shaft of the motor, a gear set engaged with the driving gear, a follower gear engaged with the gear set and a central shaft coupled with the follower gear. In such a way, when the power tool is temporarily operated as a manual screwdriver, the follower gear alternatively serves as a temporary driving gear. The torque generated thereby is transmitted by the gear set to the original driving gear which is coupled to the driving shaft of the motor. As such, the screwdriver bit runs idly, and the power tool cannot be used as a manual screwdriver.

Taiwan Patent Nos. 410,714 and 334,869 have proposed main shaft locking mechanisms as a solution with respect to the foregoing problems. However, the main shaft locking mechanisms employs a fixing ring, and a main shaft and a plurality of rollers or steel balls secured in an inner hole of the fixing ring. When the power fails to be provided to the power tool and an external force is applied to drive the main shaft to rotate, the main shaft drives the rollers or the steel balls to interfere against the fixing ring, thereby locking up the main shaft. However, the mechanism requires the fixing ring to be machined with a very high precision, which makes concentricity between the main shaft and the fixing ring. Otherwise, an unsatisfactory concentricity between the main shaft and the fixing ring may adversely cause the force to be non-uniformly distributed onto the rollers or the steel balls, so as to impair the locking effect.

SUMMARY OF THE INVENTION

A primary objective of the present invention is to provide a main shaft locking mechanism to overcome the aforementioned disadvantage of unsatisfactory concentricity between a main shaft and a fixing ring which impairs the locking effect.

The characteristic of the present invention is to provide a fixing ring inside a housing of a power tool, and a main shaft and a plurality of detents are disposed inside the fixing ring. The detents according to the present invention are provided as a substitution for the rollers or steel balls of the conventional main shaft locking mechanism. The main shaft is formed into a polygonal shape. When the polygonal main shaft is driven by an external force to rotate, corners of the main shaft drive the detents to deviate. In such a way, all of the detents are uniformly applied with a counterforce by the fixing ring, and therefore the main shaft is locked thereby without being affected by the unsatisfactory concentricity between the fixing ring and the main shaft. When the external force is released from the main shaft, and the power tool is provided with the power supply again, the main shaft and the detents are driven to rotate.

The main shaft locking mechanism according to the present invention includes the fixing ring, the main shaft, and the detents. A part of the main shaft has a polygonal cross section with a plurality of corners. The number of the detents is correspondingly equal to that of the corners of the main shaft. Each of the detents has an exterior side and an interior side opposite to the exterior side. The exterior side is configured with an arcuate shape. The interior side includes two corner protrusions symmetrically protruded out from two ends thereof. The interior side is further configured with a concave portion defined between the two corner protrusions. The main shaft is assembled through a central hole of a driving plate which is coupled to a power supply system, and then is assembled through an inner hole of the fixing ring. An inner wall of the central hole is configured with a plurality of sector protrusions corresponding to the sides of polygonal main shaft. Each of the detents is disposed between the main shaft and the inner wall of the fixing ring, such that each corner of the main shaft is received in the concave portion of the corresponding detent. Each sector protrusion includes a central projected portion and two bevel sides and is positioned in correspondence with the corresponding side of the polygonal main shaft. The driving plate further includes a plurality of operation pins, each of which is positioned between the two adjacent detents. In a normal operation state, the power tool is operated to output a dynamic power. When the driving plate rotates, the operation pins of the driving plate drive the detents to rotate within the fixing ring around the main shaft. Bevel sides of the sector protrusions then carry the main shaft to rotate. In such a way, dynamic power can be normally output from the main shaft. When the supply of the power is stopped, and the main shaft is driven by an external force to rotate toward a certain direction, the corners of the main shaft drive the detents to deviate. Therefore the exterior sides of the detents interfere with the fixing ring so that the detents endure a counterforce from the fixing ring to drive the detents to counter rotate. In such a way, the main shaft is locked and stopped from undesirable rotation.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate an embodiment of the invention and, together with the description, serve to explain the principles of the invention.

Figure 1:
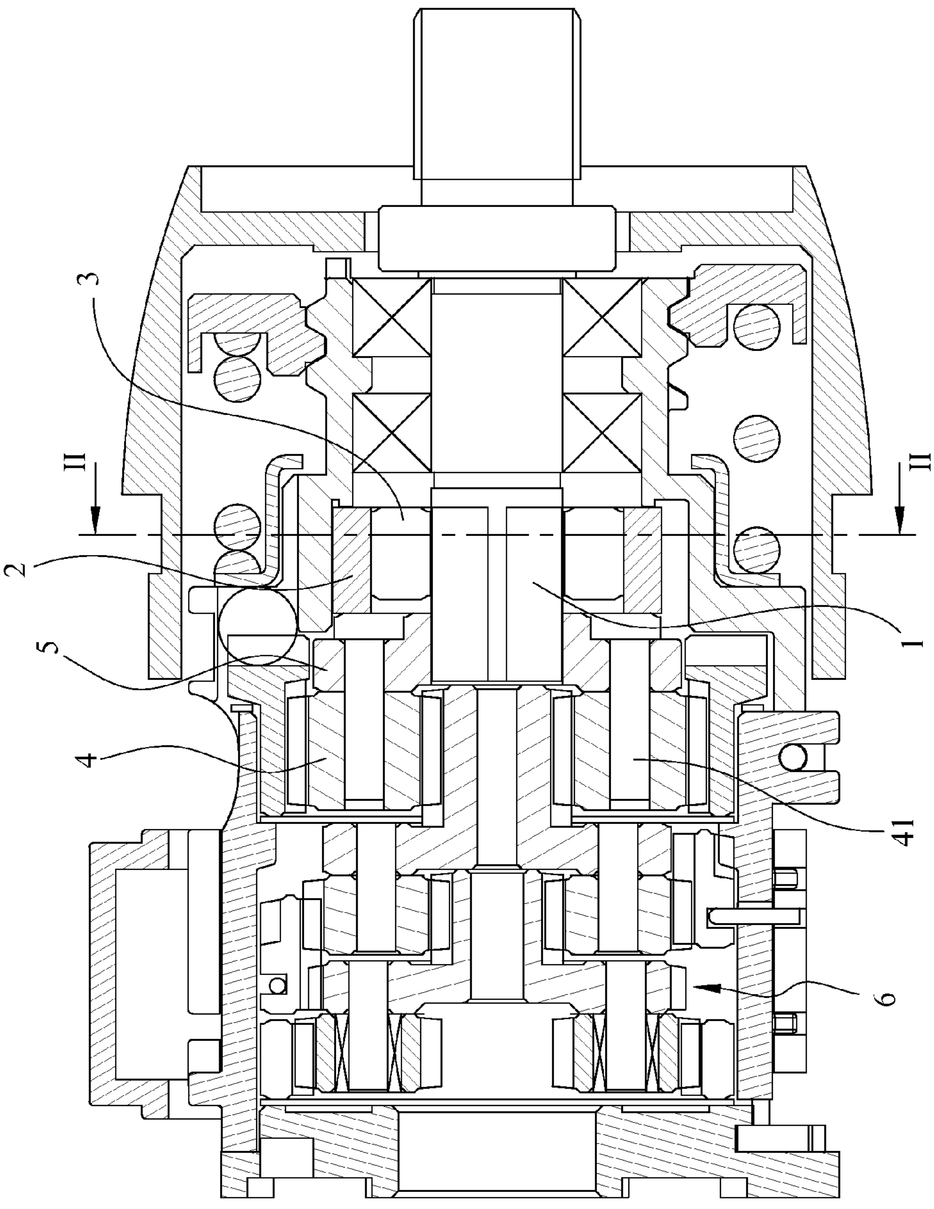
FIG. 1 is a cross sectional view showing a main shaft locking mechanism of a power tool according to an embodiment of the present invention.
Figure 2:
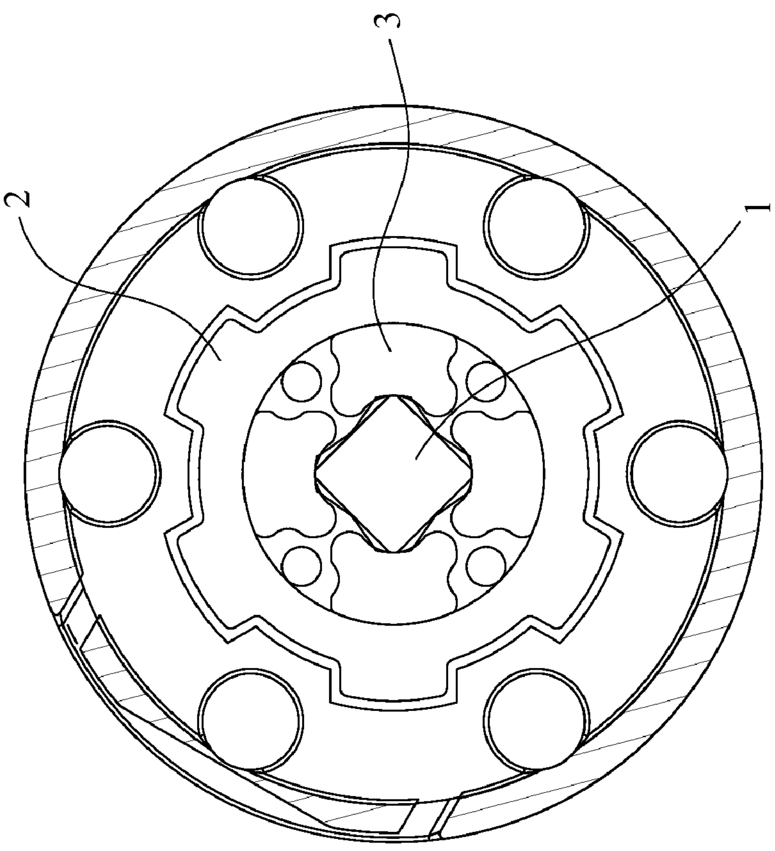
FIG. 2 is a cross sectional view showing the main shaft locking mechanism taken along line II-II of FIG. 1, looking in the direction of the arrows.

FIG. 1 is a cross sectional view showing a main shaft locking mechanism of a power tool according to an embodiment of the present invention. FIG. 2 is a cross sectional view showing the main shaft locking mechanism taken along line II-II of FIG. 1, looking in the direction of the arrows. Referring to FIGS. 1 and 2, the main shaft locking mechanism according to the present invention includes a main shaft 1, a fixing ring 2, a plurality of detents 3, a planetary gear set 4, a driving plate 5 and a gear reduction unit 6. The main shaft 1 is assembled with a bearing that is disposed in a housing of the power tool. The main shaft 1 is adapted for being driven to rotate. A front end of the main shaft 1 is configured extending out of the housing for holding a tool bit, such as a drill bit or a screwdriver bit. The fixing ring 2, the detents 3, planetary gear set 4, the driving plate 5 and the gear reduction unit 6 are disposed in the housing. The gear reduction unit 6 is disposed at a rear end of the housing and coupled with a motor. The planetary gear set 4 is coupled with the gear reduction unit 6 and is disposed at the rear end of the housing. The planetary gear set 4 further includes a plurality of pin shafts 41 configured at a front side thereof, and the pin shafts 41 are coupled with the driving plate 5. The driving plate 5 is configured with a central hole 50.

Figure 3A:
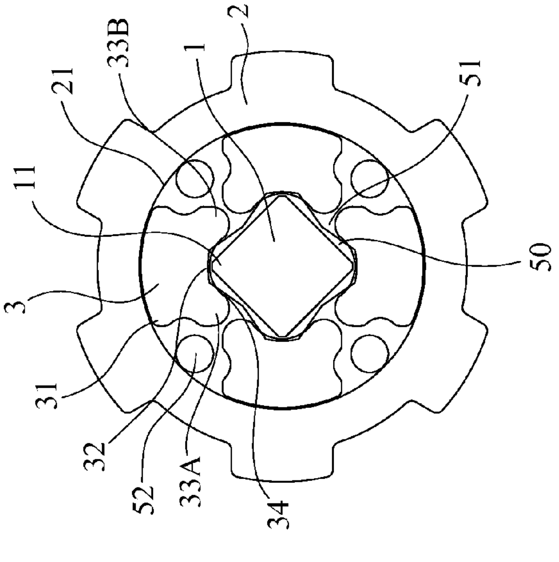
FIG. 3A is a schematic view illustrating an operation state of the main shaft locking mechanism in which the main shaft is not driven to rotate and the detents are not driven to deviate.

FIG. 3A is a schematic view illustrating an operation state of the main shaft locking mechanism in which the main shaft 1 is not driven to rotate and the detents 3 are not driven to deviate. As shown in FIG. 3A, a plurality of sector protrusions 51 are evenly distributed on a circumferential surface of the central hole 50. The driving plate 5 further includes a plurality of operation pins 52 disposed on a plate surface thereof. The number of the operation pins 52 is equal to that of the detents 3. A rear end of the main shaft 1 is a portion whose cross section is an equilateral polygon. The number of the sector protrusions 51 is equal to that of sides of the polygonal main shaft 1. According to the embodiment of the present invention, the cross section of the rear end of the main shaft 1 is a square. Correspondingly, four of the sector protrusions 51 are distributed around the central hole 50 and are disposed 90° apart from one another. The rear end of main shaft 1 is assembled through the central hole 50 of the driving plate 5 and an inner hole of the fixing ring 2.

Further referring to FIG. 3A, each of the detents 3 is a block member including an exterior side 31 and an interior side 32 opposite to the exterior side 31. The exterior side 31 is configured with an arcuate shape. According to the embodiment of the present invention, the exterior side 31 is preferably configured with a radian same as that of an inner wall 21 of the fixing ring 2. Of course, the exterior side 31 according to another embodiment may have a radian different from that of the inner wall 21 of the fixing ring 2. The interior side 32 is configured with two corner protrusions 33A and 33B protruded out from two ends of the interior side 32. The interior side 32 is further configured with a concave portion 34 defined between the corner protrusions 33A and 33B. Each of the detents 3 is disposed between the main shaft 1 and the inner wall 21 of the fixing ring 2, such that each corner 11 of the main shaft 1 is received in the concave portion 34 of the detent 3. Each of the sector protrusions 51 includes a central projected portion and two bevel sides and is positioned in correspondence with the side of the polygonal main shaft 1. Each of the operation pins 52 of the driving plate 5 is disposed between the two adjacent detents 3.

Figure 4B:
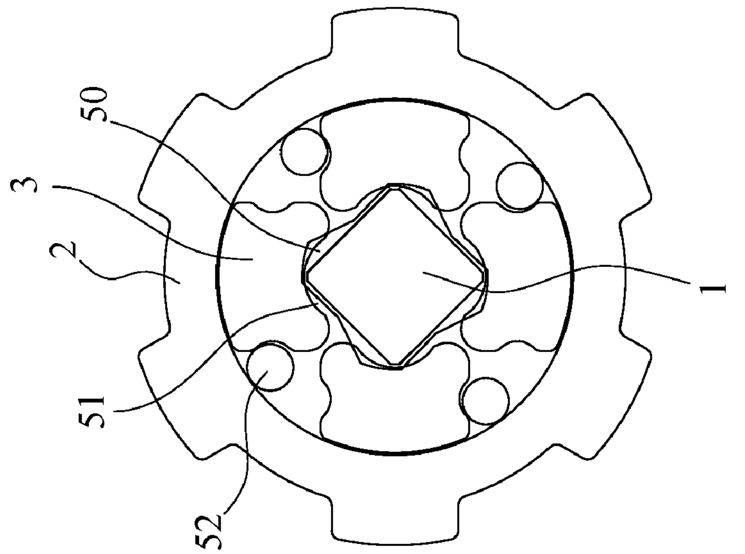
FIG. 4B illustrates a further operation state of the driving plate subsequent to the state shown in FIG. 4A, in which the operation pins drive the detents and sector protrusions get in contact with the sides of the main shaft to drive the main shaft to rotate.
Figure 4A:
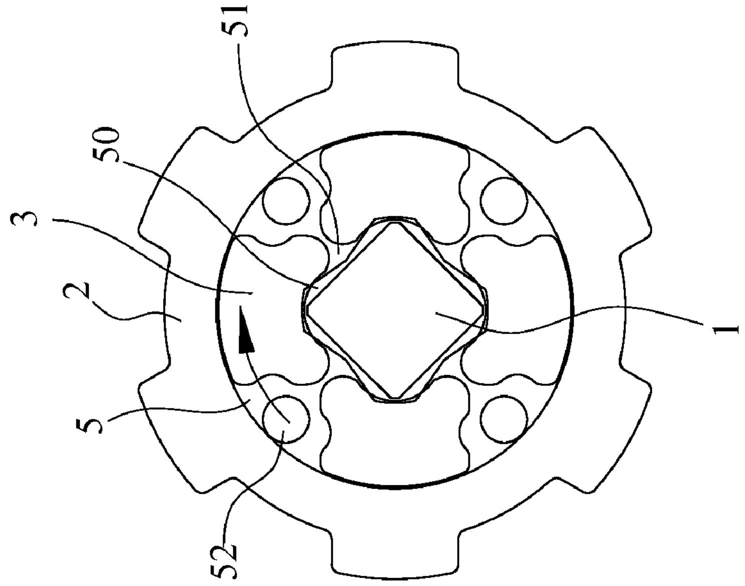
FIG. 4A illustrates an operation state of the driving plate rotating clockwise according to the present invention.

When the power tool is in operation, the main shaft 1 is rotated to drive the drill tip or screwdriver tip to rotate. In this case, the motor of the power tool drives the gear reduction unit 6 to operate, which carries the planetary gear set 4 and the driving plate 5 to rotate. FIG. 4A illustrates an operation state of the driving plate 5 rotating clockwise according to the present invention. FIG. 4B illustrates a further operation state of the driving plate 5 subsequent to the state shown in FIG. 4A, in which the operation pins 52 drive the detents 3 and sector protrusions 51 get in contact with the sides of the main shaft 1 to drive the main shaft 1 to rotate. Referring to FIGS. 4A and 4B, the driving plate 5 is driven to rotate clockwise and thus the operation pins 52 simultaneously get in contact with the detents 3. Correspondingly, one of the two bevel sides of each sector protrusion 51 get in contact with the corresponding side of the polygonal main shaft 1. In such a way, the driving plate 5 drives the main shaft 1 to rotate. Meanwhile, the detents 3 rotate within the fixing ring 2 around the main shaft 1. Similarly, the driving plate 5 can also rotate counterclockwise to drive the main shaft 1 as the way mentioned above.

Figure 3B:
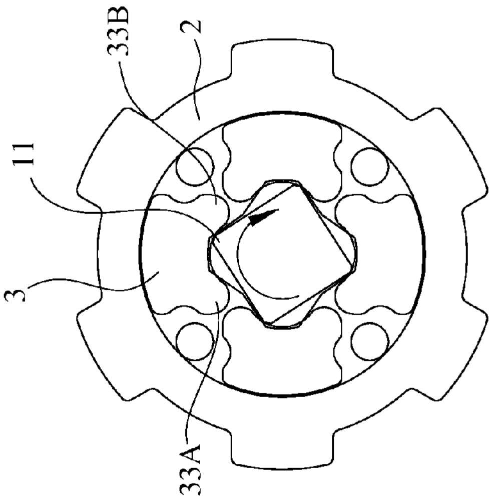
FIG. 3B is a schematic view illustrating another operation state of the main shaft locking mechanism in which the main shaft is driven to rotate clockwise, and each corner of the main shaft gets in contact with one of the two corner protrusions of a corresponding detent.
Figure 3C:
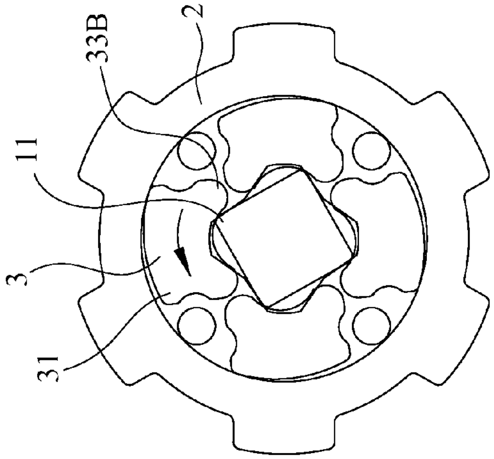
FIG. 3C is a schematic view illustrating a further operation state of the main shaft locking mechanism in which the main shaft is further driven to rotate subsequent to the state of FIG. 3B, wherein the corners of the main shaft drive the corner protrusions of the detents, and therefore the detents deviate to interfere with the fixing ring.

FIG. 3B is a schematic view illustrating another operation state of the main shaft locking mechanism in which the main shaft is driven to rotate clockwise, and each corner of the main shaft 1 gets in contact with the corner protrusion 33B of the corresponding detent 3. When the power tool according to the present invention is not provided with any power and is used as a manual tool, the motor has no dynamic power output therefrom. In this case, when the main shaft 1 is applied with a clockwise torque, each of the corners 11 of the main shaft 1 rotates a certain angle and then presses against the corresponding corner protrusion 33B (when applied with a counterclockwise torque, the corner 11 will press against the corner protrusion 33A). When the main shaft 1 is further driven to rotate, each of the corners 11 urges the corner protrusion 33B of the corresponding detent 3 toward the inner wall 21 of the fixing ring 2. As such, the exterior side 31 of the detent 3 deviates away from the inner wall 21 of the fixing ring 2 (as shown in FIG. 3C), so as to generate a counterforce for locking up the main shaft 1 and preventing the main shaft 1 from undesirable rotation.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A main shaft locking mechanism, comprising:

a fixing ring having a circular inner wall;

a driving plate coupled to a power supply unit, wherein the driving plate comprises a central hole and a plurality of operation pins, and a plurality of sector protrusions are distributed at a circumferential edge of the central hole;

a main shaft comprising a portion whose cross section is an equilateral polygon, wherein the equilateral portion has a plurality of sides and a plurality of corners, a number of the sides of the equilateral portion is equal to that of the sector protrusions, and the equilateral portion of the main shaft is disposed through the central hole of the driving plate;

a plurality of detents, wherein a number of the detents is equal to that of the corners of the equilateral portion of the main shaft, each of the detents comprises an exterior side and an interior side opposite to the exterior side, the exterior side is arcuate shaped, the interior side is configured with two corner protrusions protruded out from two ends of the interior side, the interior side is further configured with a concave portion defined between the two corner protrusions, each of the detents is disposed between the main shaft and the inner wall of the fixing ring, such that each of the corners of the main shaft is received in the concave portion of the corresponding detents, and each of the operation pins is disposed between the two adjacent detents.

2. The main shaft locking mechanism according to claim 1, wherein a radian of the exterior side of the detent is equal to that of the inner wall of the fixing ring.

3. The main shaft locking mechanism according to claim 1, wherein the cross section of the main shaft is a square, and there are four of the detents.

4. The main shaft locking mechanism according to claim 1, wherein the corner protrusions of the detents are arcuate shaped.

* * * * *